United States Patent [19]

Takei

[11] Patent Number: 5,648,691

[45] Date of Patent: Jul. 15, 1997

[54] LINEAR DIRECT CURRENT MOTOR

[75] Inventor: Seiji Takei, Kanagawa, Japan

[73] Assignee: Nippon Thompson Co., Ltd., Tokyo, Japan

[21] Appl. No.: 462,892

[22] Filed: Jun. 5, 1995

[30] Foreign Application Priority Data

Jul. 29, 1994 [JP] Japan .................... 6-197333

[51] Int. Cl.⁶ .................................................. H02K 41/02
[52] U.S. Cl. ........................................................ 310/12
[58] Field of Search .............................. 310/12, 13, 14, 310/68 B

[56] References Cited

U.S. PATENT DOCUMENTS 4,868,443   9/1989   Rossi .................... 310/268

Primary Examiner—Steven L. Stephan
Assistant Examiner—Judson H. Jones
Attorney, Agent, or Firm—Sughrue, Mion, Zinn, Macpeak & Seas

[57] ABSTRACT

A linear direct current motor is described that is able to maintain stable thrust at all times regardless of changes in the relative positions of the primary and secondary sides.

The endmost magnetic poles of a field magnet are used as non-detected magnetic poles with respect to magnetic pole discrimination elements, while these non-detected magnetic poles are used only as driving magnets for generation of thrust. Consequently, the effect of the present invention is able to be obtained by reducing the range of variation in the number of armature coil conductors that actually produce thrust.

4 Claims, 16 Drawing Sheets

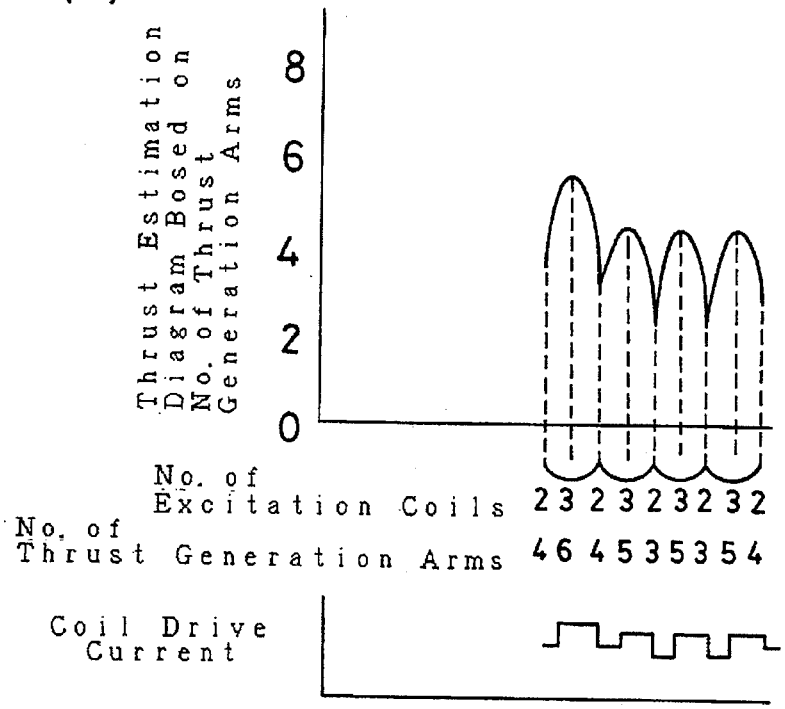
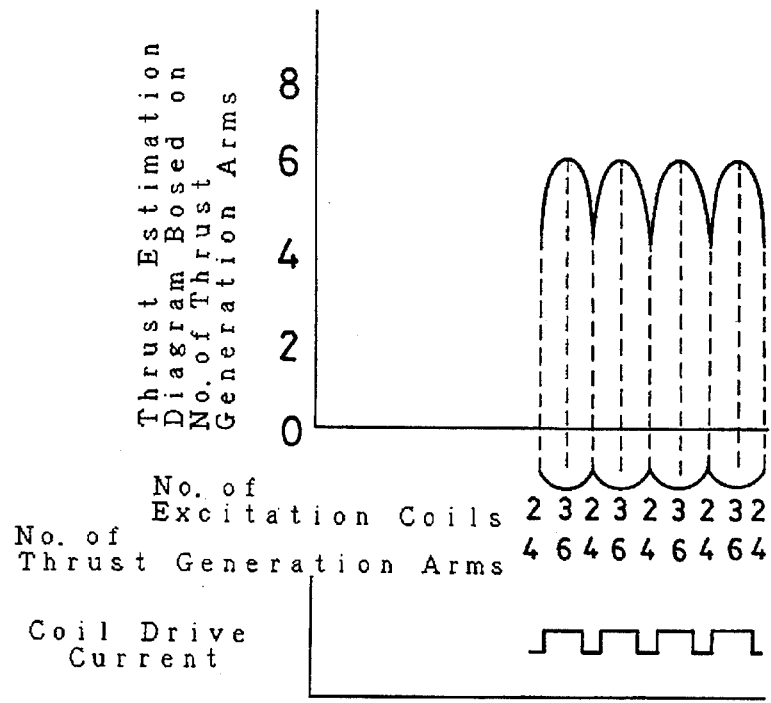
Fig.16

LINEAR DIRECT CURRENT MOTOR

BACKGROUND OF THE INVENTION

1. Field of the Invention

The present invention relates to a linear direct current motor commonly used for moving an object to be moved with high accuracy in, for example, a motion mechanism such as a machine tool or industrial robot, and more particularly, to a brushless type of linear direct current motor.

2. Description of the Prior Art

FIG. 1 shows a drive unit containing a linear direct current motor of the prior art. Furthermore, this drive unit has a guide unit for guiding an object added to a linear direct current motor.

As shown in the drawing, this drive unit has a long base member 1 and moving body 2 that moves along said base member 1. More specifically, a plurality of rollers (not shown) are provided on moving body 2, and these rollers roll over a track (not shown) formed along the lengthwise direction in base member 1.

On the other hand, the linear direct current motor that composes a drive unit together with the above-mentioned guide unit is composed in the manner described below.

Said linear direct current motor is composed of a primary side, equipped with a large number of armature coils 5 arranged in a row in the lengthwise direction of base member 1 on said base member 1, and a secondary side, having a field magnet 6 (see FIG. 2) attached to the bottom surface of moving body 2 so as to oppose each of said armature coils 5. As shown in the drawing, said field magnet 6 is magnetized so that a plurality, in this case 4, of N and S magnetic poles are alternately arranged in a row along direction P in which moving body 2 is to move, namely the lengthwise direction of base member 1. Furthermore, as shown in FIG. 2, if the width of one magnetic pole of field magnet 6 is taken to be Pm in this example, the open angle width of each armature coil 5 is set to the same Pm, and the interval of the armature coils is set to Pm/3.

In the linear direct current motor of the above-mentioned constitution, by supplying a prescribed excitation current to armature coils 5, thrust is generated based on Fleming's right hand rule between the primary and secondary sides. For example, if base member 1, to which the primary side is coupled, is taken to be the stationary side, moving body 2, integrated into a single unit with the secondary side, is moved by this thrust.

However, in the linear direct current motor as described above, it is important to systematically supply an excitation current to each armature coil to maintain as constant a thrust as possible regardless of changes in the position of the primary side with respect to the secondary side. Continuing, the following provides an explanation of the constitution pertaining to this supply of power.

As shown in FIGS. 3 through 5, magnetic pole discrimination elements in the form of Hall effect elements $8a$ through $8e$ are respectively arranged in the vicinity of each armature coil $5a$ through $5e$ (these five armature coils are mutually distinguished by adding small letters of the alphabet from a through e to reference numeral 5 indicating armature coils in the explanation thus far for the sake of convenience in the explanation). In this example, each of Hall effect elements $8a$ through $8e$ is arranged corresponding to conductors $5a_2$ through $5e_2$ on one side among the conductors (arms) that contribute to thrust possessed on two sides by each armature coil $5a$ through $5e$. These Hall effect elements $8a$ through $8e$ emit a signal (in the form a potential difference) corresponding to the lines of magnetic force emitted by each magnetic pole possessed by field magnet 6 when said field magnet 6 approaches. Electrical power is then supplied to the armature coil corresponding to the Hall effect element that emitted said signal based on that signal. Alternatively, this supply of electrical power is interrupted to the armature coil corresponding to a Hall effect element for which said signal has yet to be obtained or is no longer being obtained, thus enabling control to be performed.

Control of the supply of electrical power is performed in the manner described below based on said constitution.

In FIGS. 3 through 5, the letters (a) through (i) indicate that field magnet 6 is located at each of the positions shown in the drawing corresponding to those letters.

To begin with, in the case field magnet 6 is located at position (a) of FIG. 3, since each of magnetic poles $6b$ and $6c$ of said field magnet 6 acts on two Hall effect elements $8a$ through $8b$, the two armature coils $5a$ and $5b$ that respectively correspond to these Hall effect elements are supplied with electrical power. Furthermore, although operation after this point is similar, the Hall effect elements that act on the respective boundaries of each magnetic pole ($6a$ and $6d$) do not operate. In this state, all conductors, which are possessed on two sides each by each of said armature coils $5a$ and $5b$, contribute to thrust, and these conductors consist of conductors $5a_1$, $5a_2$, $5b_1$ and $5b_2$. These are indicated with a circle in FIG. 3. Thrust is generated since these four conductors act on magnetic poles $6a$, $6b$ and $6c$ of field magnet 6. Furthermore, since conductors $5c_1$ and $5c_2$ of the other armature coil $5c$ act on the boundary between corresponding magnetic poles of field magnet 6 (conductors $5c_1$ and $5c_2$), thrust is not generated even though power is supplied to armature coil $5c$.

Next, as shown in FIGS. 3 through 5, in the case the open angle width of the armature coils is taken to be Pm, the interval between the armature coils is taken to be Pm/3, and this is divided into 8 divisions, when field magnet 6 is at position (b) in FIG. 3, namely when moved by 1/8, since each of magnetic poles $6a$ through $6d$ of said field magnet 6 acts on three Hall effect elements $8a$ through $8c$, three armature coils $5a$ through $5c$, which respectively correspond to these Hall effect elements, are supplied with electrical power. In this state, conductors possessed on two sides each by each of said armature coils $5a$, $5b$ and $5c$ all contribute to thrust, and consist of the six conductors $5a_1$, $5a_2$, $5b_1$, $5b_2$, $5c_1$ and $5c_2$. These are indicated with a circle in FIG. 3. Thrust is generated since these six conductors act on magnetic poles $6a$, $6b$, $6c$ and $6d$ of field magnet 6.

Thus, when field magnet 6 is at each of the positions of (c) through (i) shown in FIGS. 3 through 5, electrical power is continued to be supplied to the prescribed armature coils in the same manner as described above. FIG. 16 (a) illustrates the relationship with coil drive current based on the number of coils and the number of arms obtained in this manner.

Although excitation current is supplied to each armature coil in the manner described above in the above-mentioned example of a linear direct current motor of the prior art, the prior art has the problems described below.

Namely, when field magnet 6 is located at position (a) shown in FIG. 3, thrust is actually generated by four of the conductors that contribute to thrust possessed by each armature coil as previously described. However, the number of conductors that generate thrust when field magnet 6 is moved to the other positions of (b) through (i) changes, namely being 6, 4, 5, 3, 5, 3, 5 and 4 conductors, respectively. Thus, a constant level of thrust cannot be obtained at all times due to the wide range of variation. This is clear from FIG. 16 (a).

SUMMARY OF THE INVENTION

In consideration of the above-mentioned problems of the prior art, the object of the present invention is to provide a linear direct current motor able to maintain a constant level of thrust at all times regardless of changes in the relative positions of the primary and secondary sides. In addition, the object of the present invention is to provide a linear direct current motor that is able to achieve the above-mentioned object with a simple constitution.

The linear direct current motor according to the present invention is equipped with: a field magnet in which P number of poles (P being an integer of at least 2) are arranged and magnetized so that they are sequentially different; a group of armature coils wound so that the open angle width of the conductors contributing to thrust is roughly 2n–1 times (where n is an integer of at least 1) the magnetic pole width of said field magnet, which relatively drive said field magnet by being arranged so as to oppose said field magnet and supplying excitation current; and, magnetic pole discrimination elements, provided corresponding to each said armature coil, which perform discrimination of the magnetic poles of said field magnet; wherein, the endmost magnetic poles of said field magnet are non-detected magnetic poles with respect to said magnetic pole discrimination elements.

BRIEF DESCRIPTION OF THE DRAWINGS

FIG. 16 is an explanatory drawing that compares changes in thrust between the drive unit of the prior art and the drive unit in the embodiment of the present invention.

DESCRIPTION OF THE PREFERRED EMBODIMENTS

The following provides an explanation of a drive unit containing a linear direct current motor as claimed in the present invention with reference to the drawings. Furthermore, this linear direct current motor is of the moving magnet type.

Said drive unit is composed by mutually combining a guide unit, which supports an object to be moved and guides said object with high accuracy, and a linear direct current motor, which functions as a driving device that drives said guide unit.

To begin with, the following provides an explanation of the above-mentioned guide unit.

Figure 1:
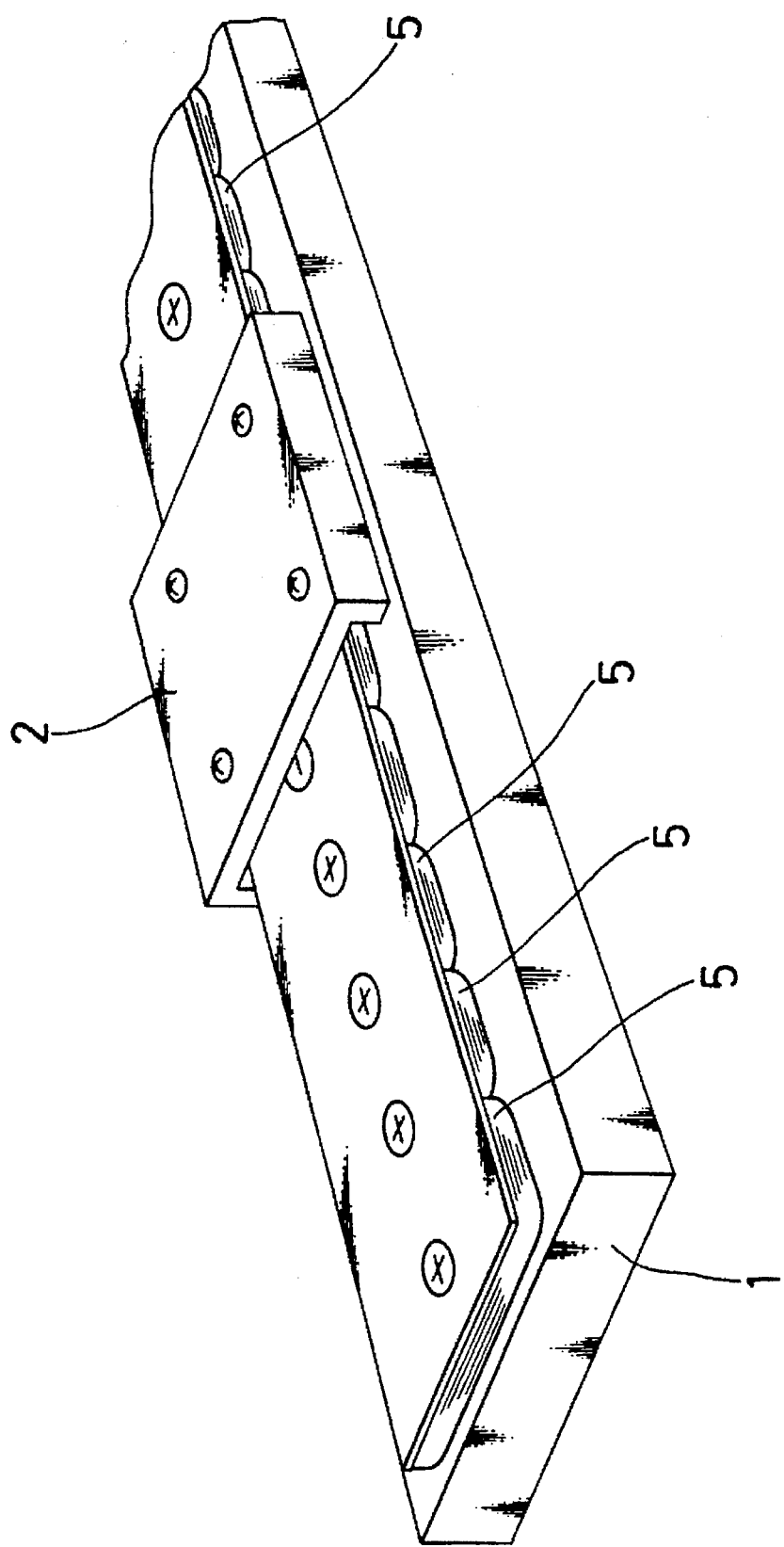
FIG. 1 is a perspective view of a portion of a drive unit containing a linear direct current motor of the prior art.
Figure 2:
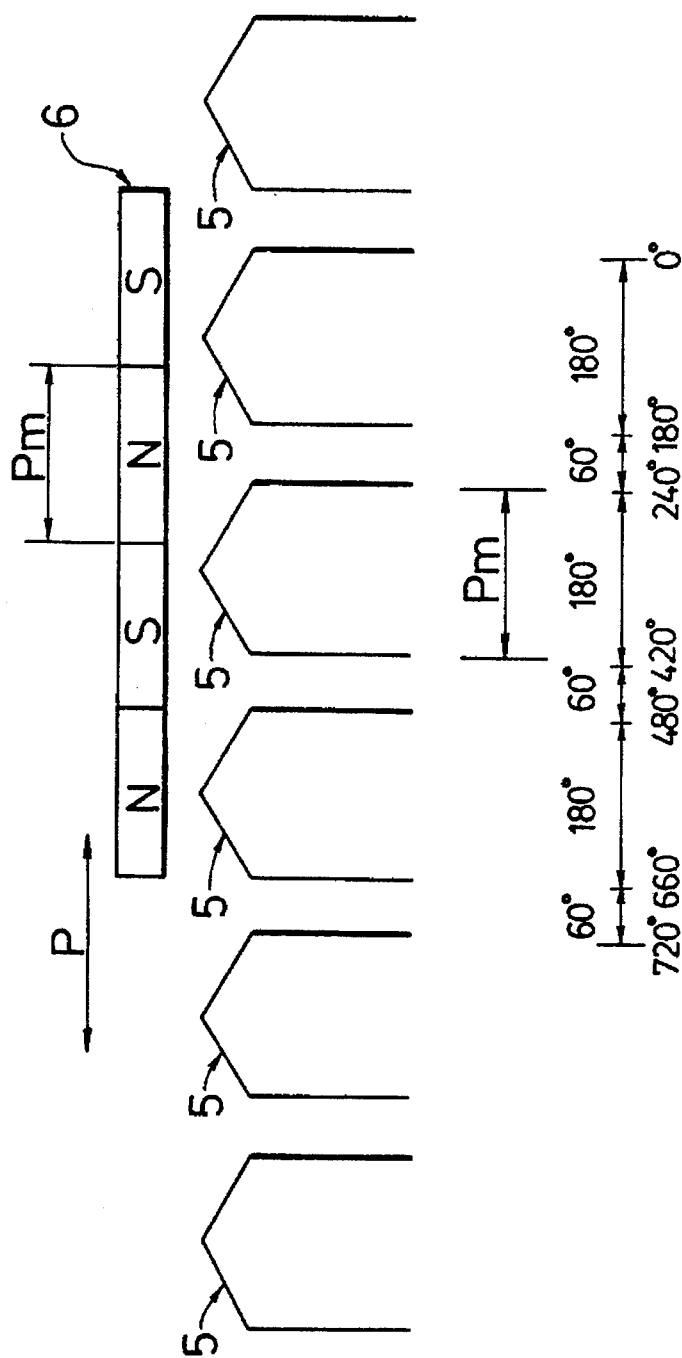
FIG. 2 is a conceptual drawing of the constitution of the linear direct current motor contained in the drive unit shown in FIG. 1.
Figure 3:
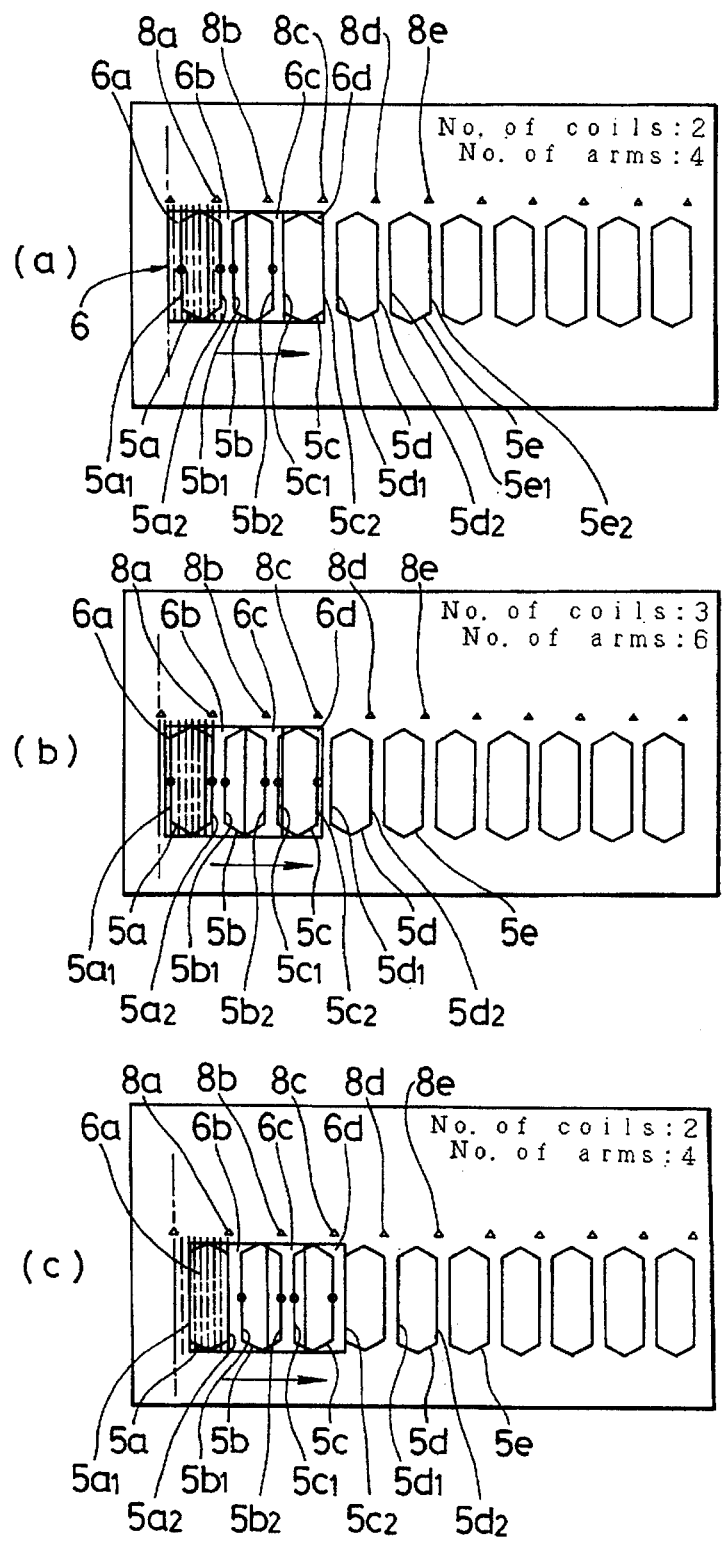
FIG. 3 is an explanatory drawing of the operation of the linear direct current motor contained in the drive unit shown in FIG. 1.
Figure 4:
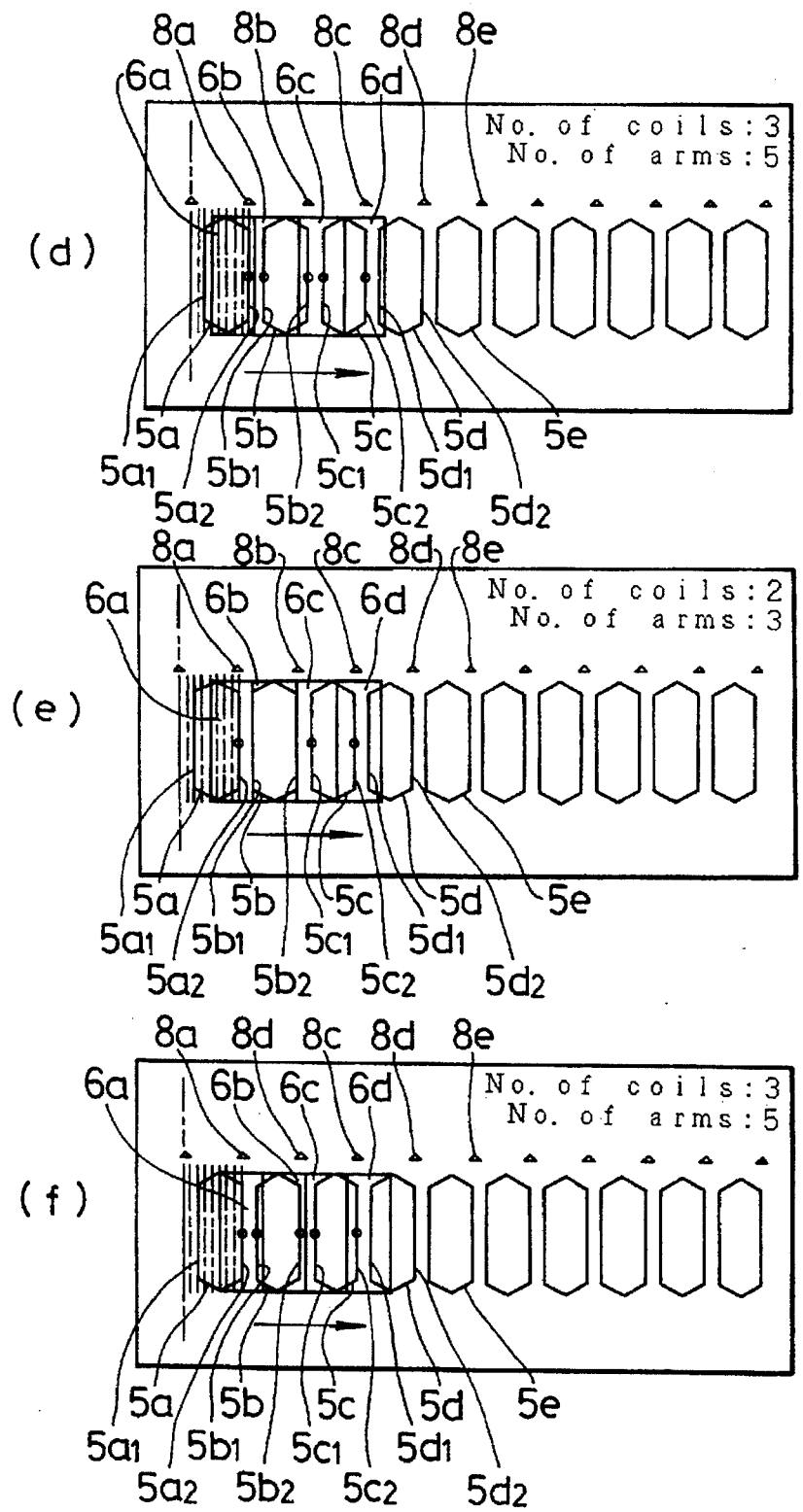
FIG. 4 is an explanatory drawing of the operation of the linear direct current motor contained in the drive unit shown in FIG. 1.
Figure 5:
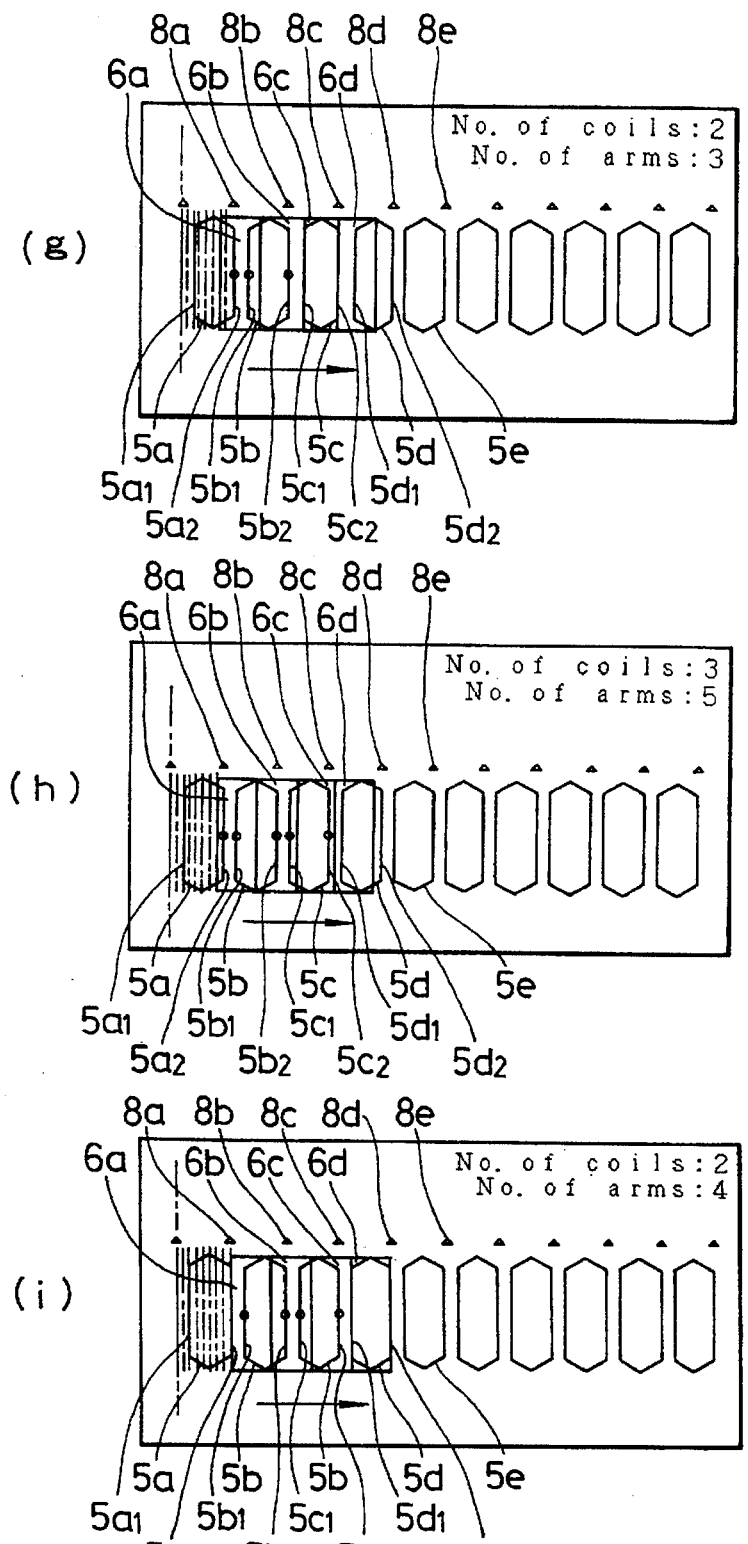
FIG. 5 is an explanatory drawing of the operation of the linear direct current motor contained in the drive unit shown in FIG. 1.
Figure 6:
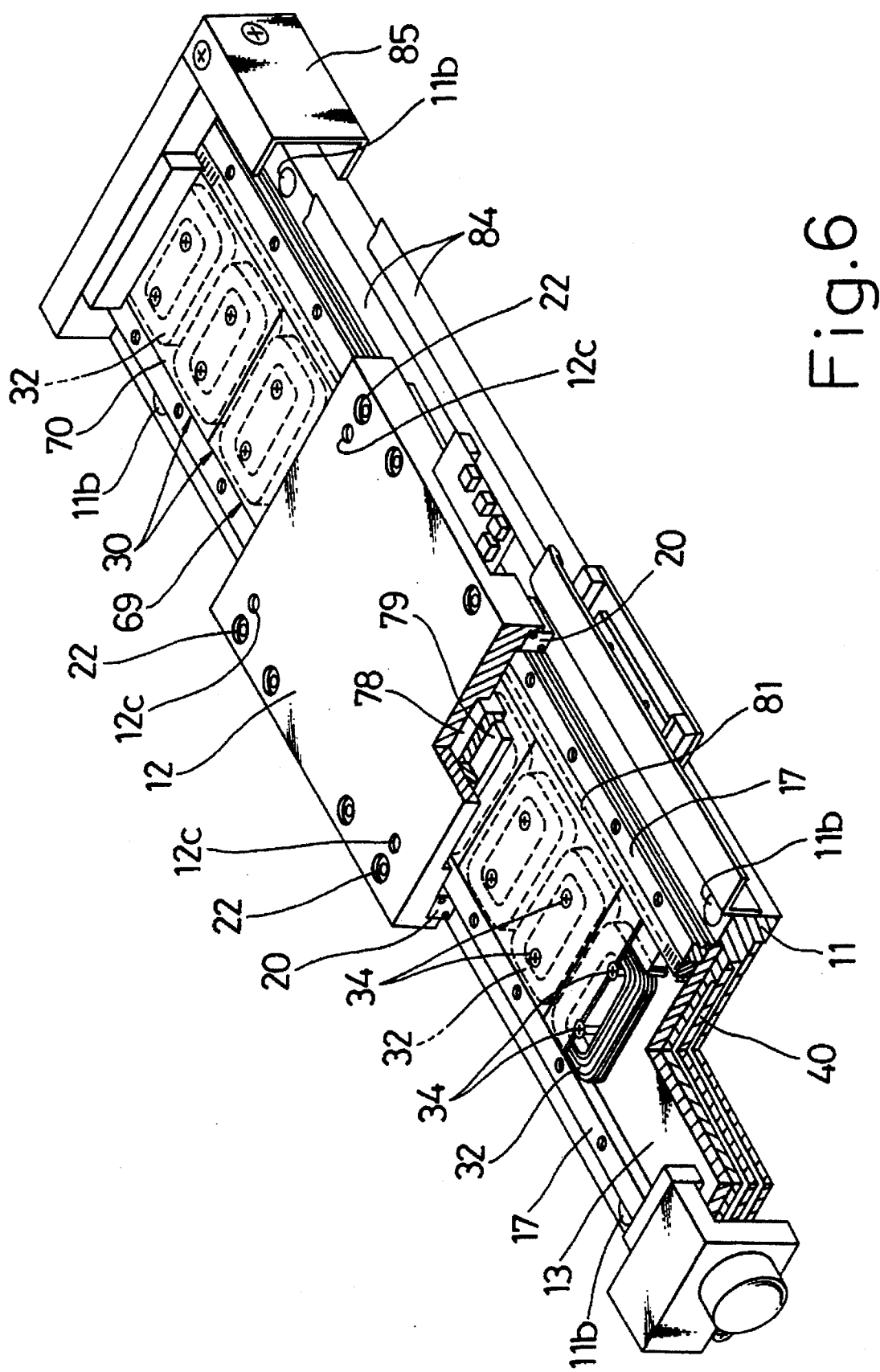
FIG. 6 is a perspective view, including a partial cross-section, of a drive unit containing a linear direct current motor as an embodiment of the present invention.
Figure 7:
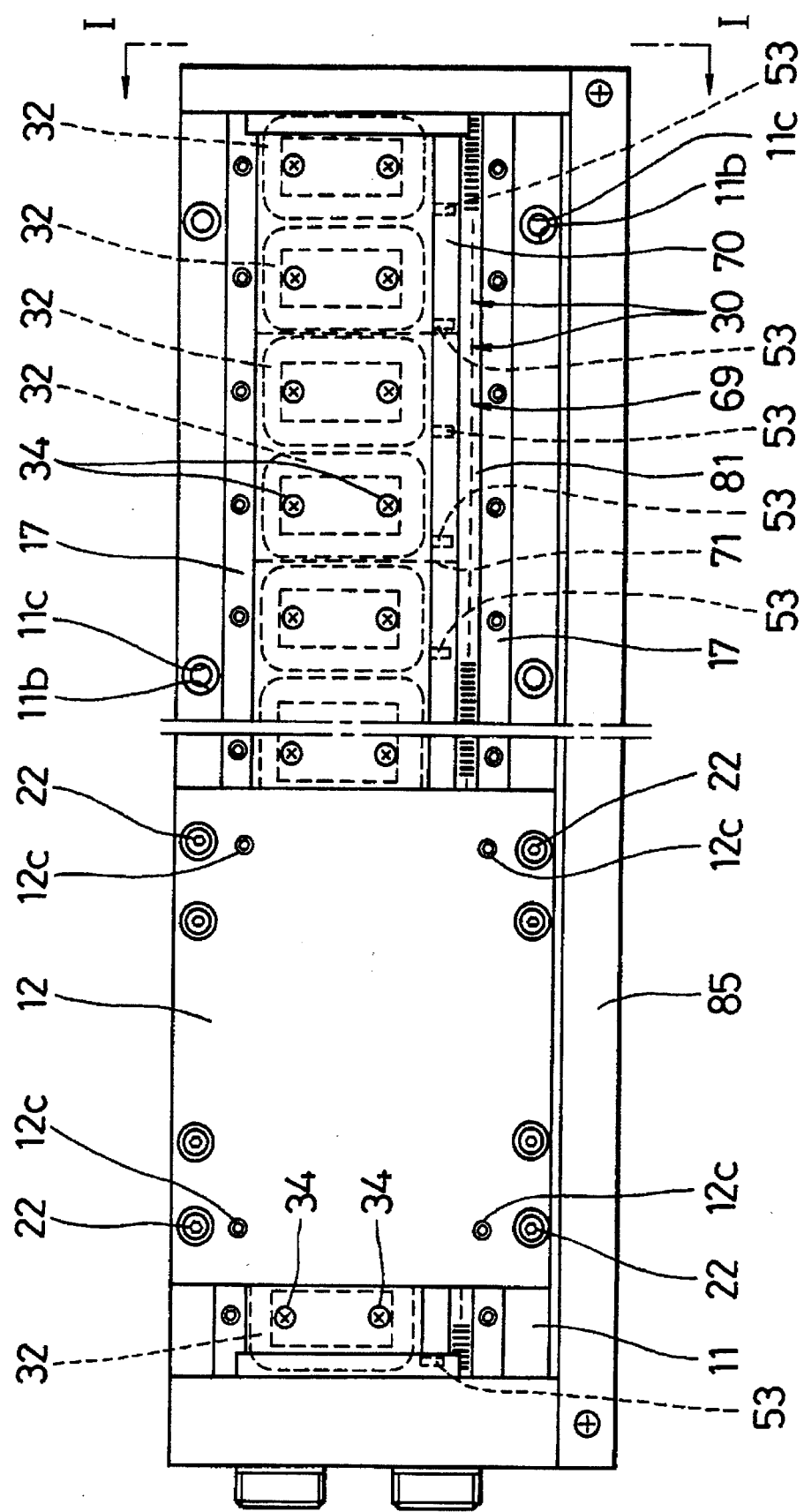
FIG. 7 is an overhead view of the drive unit shown in FIG. 6.
Figure 8:
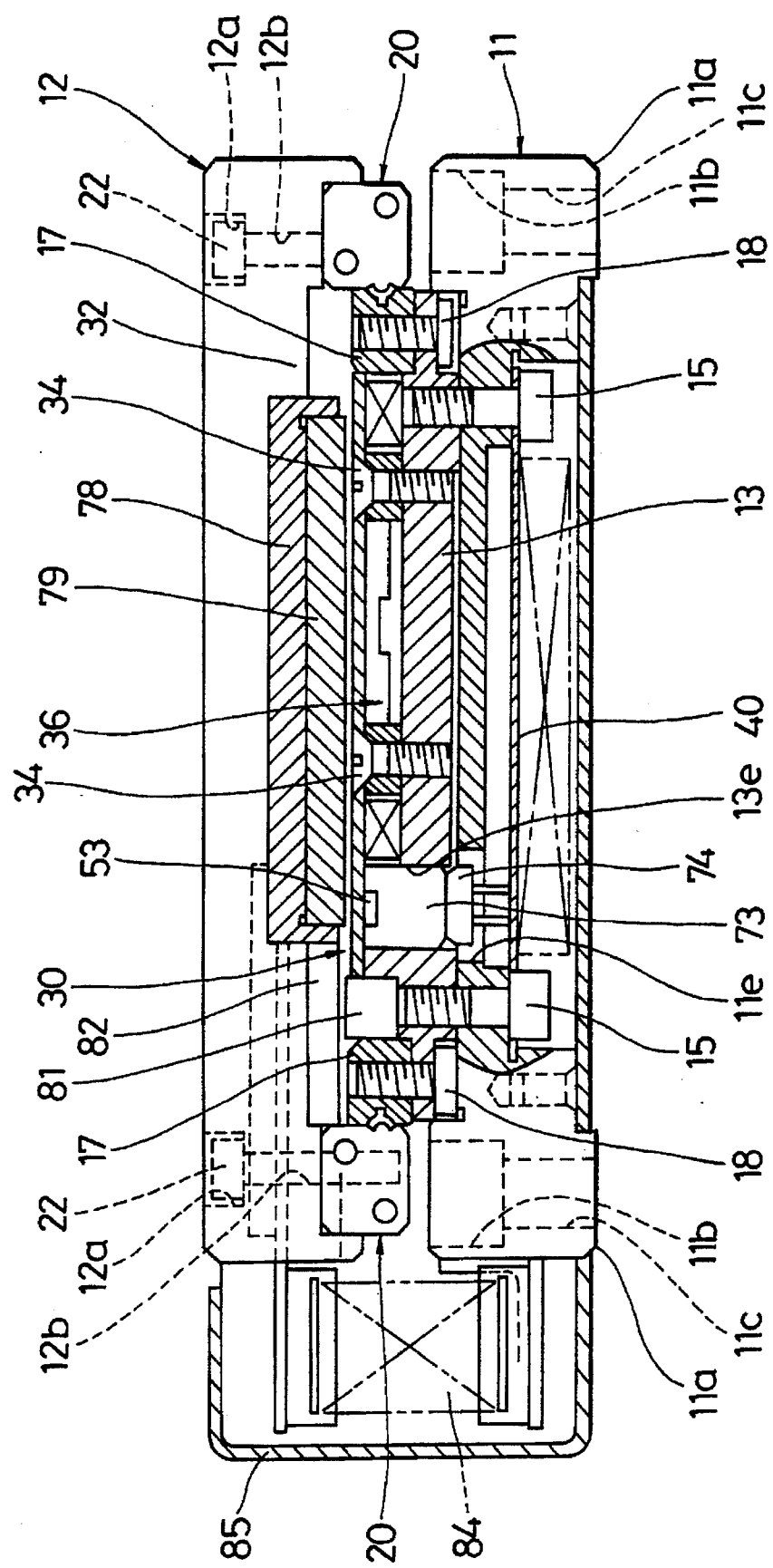
FIG. 8 is a view, including a partial cross-section, taken along arrows I—I relating to FIG. 7.

As shown in FIGS. 6 through 8, this guide unit has bed 11 formed roughly into the overall shape of, for example, a rectangular plate, and table 12 to move along the lengthwise direction of said bed 11. As shown in FIGS. 6 and 8, coil yoke 13, formed into roughly into the shape of a rectangular plate and having nearly the same length as bed 11, is arranged on the upper surface of said bed 11, and is fastened to said bed 11 by a plurality of bolts (with hexagon sockets, see FIG. 8) 15.

Two track rails in the form of track rails 17 are arranged on both sides of the upper surface of said coil yoke 13 along the lengthwise direction of said coil yoke 13, and are fastened to said coil yoke 13 by a plurality of flat head screws 18 (see FIG. 8).

Figure 9:
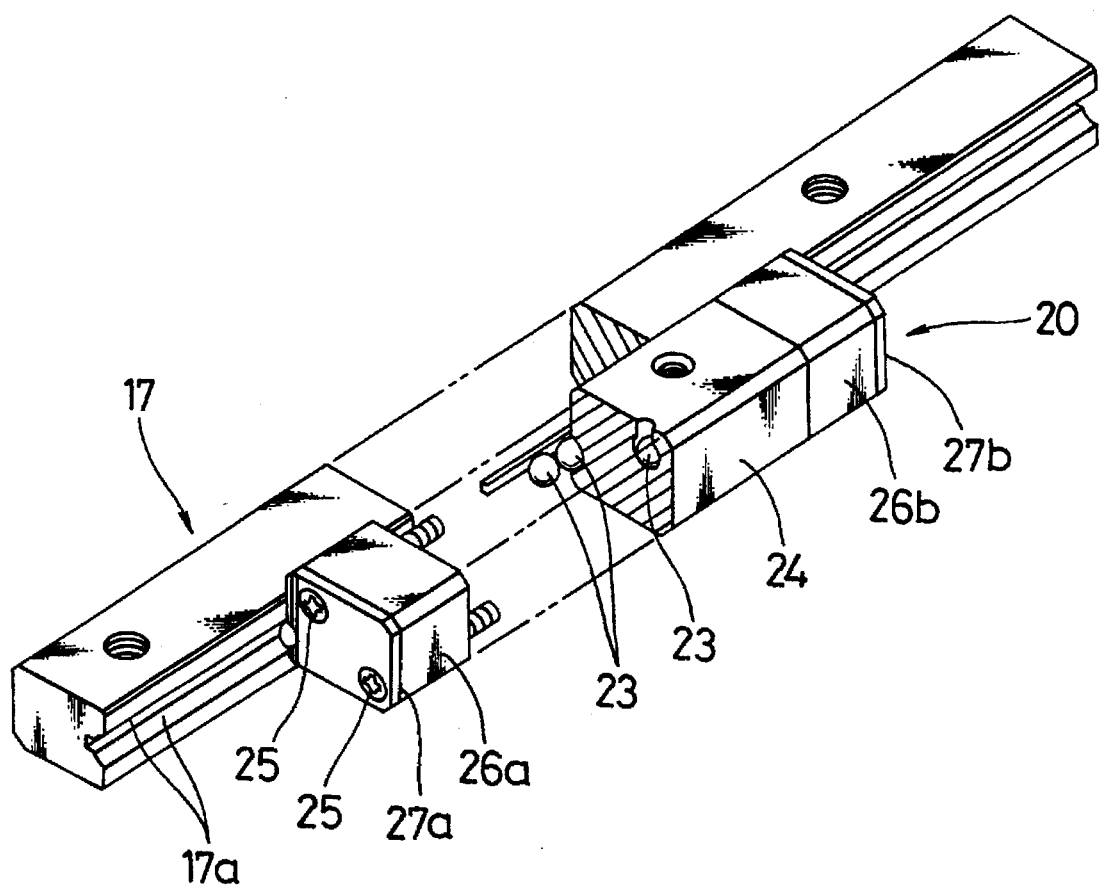
FIG. 9 is a perspective view, including a partial cross-section, of a track rail and slide member equipped on the drive unit shown in FIGS. 6 through 8.

As shown in FIG. 9, a track in the form of a single track groove 17a, having a roughly semi-circular shaped cross-section, is formed in the outside of the above-mentioned track rail 17. As is clear from FIGS. 6 and 8, a slider in the form of slide member 20, able to freely perform relative motion with respect to said track rail 17, is arranged on the outside of said track rail 17, and is fastened to the lower surface of table 12 by, for example, two bolts (with hexagon heads) 22. Furthermore, as shown in FIG. 8, countersunk portions 12a and insertion holes 12b are formed in table 12 into which the head portions and threaded portions, respectively, of bolts 22 are inserted. Bolts 22 are embedded in these countersunk portions 12a and insertion holes 12b, and do not protrude from the upper surface of table 12.

A rolling element circulating path (not shown) is formed in the above-mentioned slide member 20, and rolling elements in the form of a large number of balls 23 are arranged and contained within said rolling element circulating path. These balls 23 bear the load between track rail 17 and slide member 20 by circulating while rolling over track groove 17a of track rail 17 accompanying movement of slide member 20 with respect to track rail 17.

As shown in FIG. 9, the above-mentioned slide member 20 has casing 24, a pair of end caps 26a and 26b coupled to both ends of said casing 24 by round head screws 25, and two seals 27a and 27b fastened to the outer surfaces of both of said end caps 26a and 26b. The above-mentioned rolling element circulating path is composed of a load bearing track groove and return path formed in casing 24 mutually in parallel and passing linearly through said casing 24, and a pair of roughly arc-shaped direction changing paths formed in both end caps 26a and 26b that connect both ends of said load bearing track groove and return path. Furthermore, said load bearing track groove opposes track groove 17a of track rail 17.

The guide unit of the constitution described above is fastened to a flat mounting surface equipped on, for example, a machine tool (not shown) by a plurality of bolts (with hexagon sockets: not shown). Consequently, as shown in FIG. 8, bed 11 has flat mounting bottom surface 11a for anchoring said bed 11 to said mounting surface. As shown in FIGS. 6 through 8, countersunk portions 11b and insertion holes 11c are formed in both sides of bed 11 into which the head portions and threaded portions of the above-mentioned bolts for fastening said bed are respectively inserted. Said bolts are embedded in these countersunk portions 11b and insertion holes 11c, and do not protrude from the upper surface of bed 11. In addition, as shown in FIGS. 6 and 7, for example, four threaded holes 12c are formed in the four corners of the upper surface of table 12 able to move with respect to this bed 11, and a table (not shown) equipped on an apparatus on which said drive unit is equipped is fastened to said table 12 by bolts (not shown) screwed into these threaded holes 12c.

Continuing, the following provides a detailed description of the primary and secondary sides of the linear direct current motor that is mutually combined with the guide unit having the constitution described above.

Figure 10:
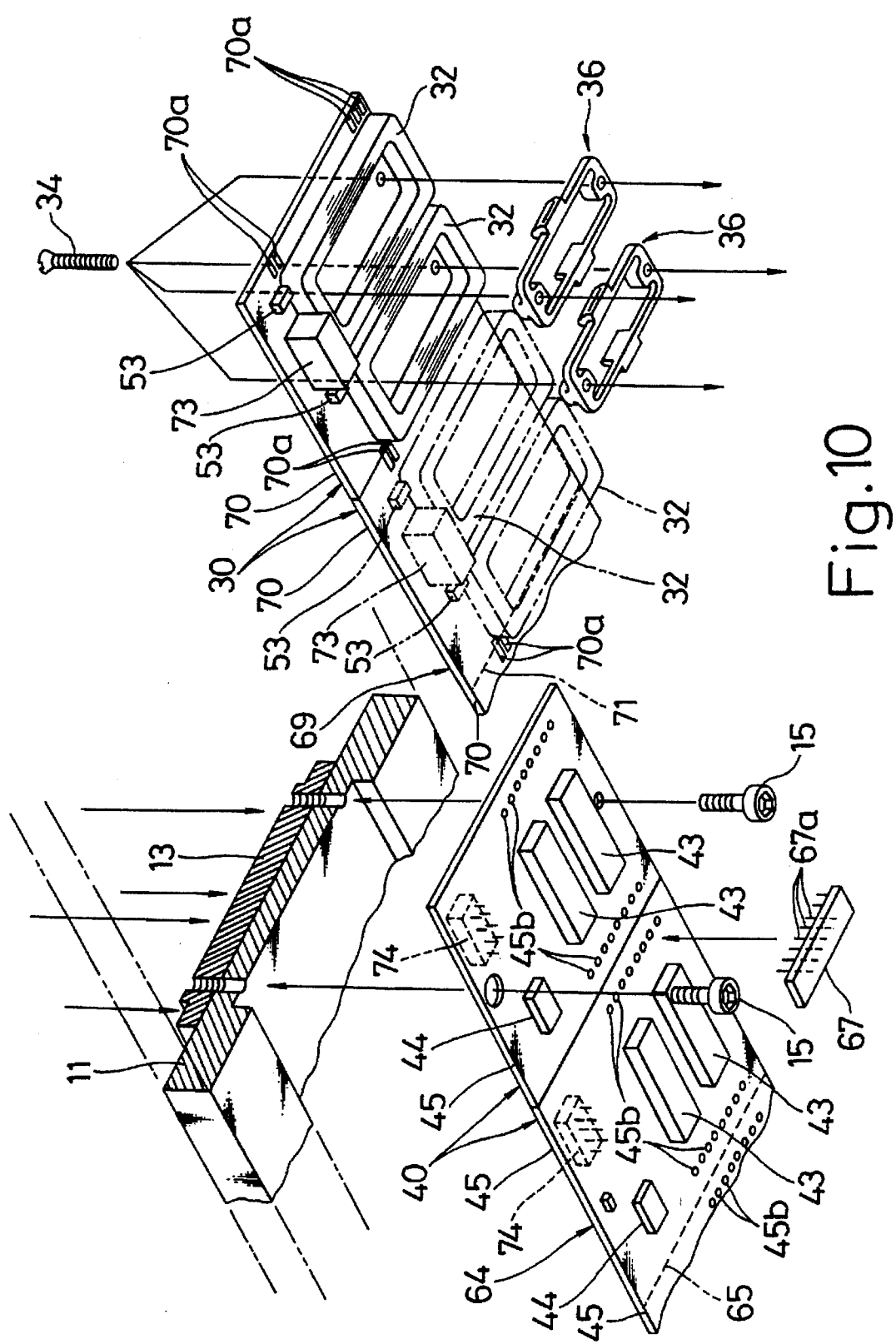
FIG. 10 is an exploded perspective view, including a partial cross-section, of the essential portion of the linear direct current motor contained in the drive unit shown in FIGS. 6 through 8.

To begin with, as shown in FIGS. 6 through 8 and 10, the primary side has the previously described coil yoke 13 installed on bed 11, coil substrate 30 arranged along the lengthwise direction of coil yoke 13 on the upper surface of said coil yoke 13, and, for example, 14 armature coils 32 supported by being affixed in a row along the direction in which the above-mentioned table 12 is to move on the lower surface of said coil substrate 30, namely the side of coil yoke 13. Furthermore, each armature coil 32 is wound into roughly the shape of a rectangular loop. In addition, as shown in FIGS. 7, 8 and 10, Hall effect elements 53 are provided corresponding to each armature coil 32 on coil substrate 30.

Each of the above-mentioned armature coils 32 and coil substrate 30 are fastened together to coil yoke 13 with said coil substrate 30 on the outside by fastening members in the form of countersunk head screws 34, two each, for example, of which are inserted for each of said armature coils 32.

As shown in FIGS. 8 and 10, spacer assemblies 36 are juxtaposed between coil substrate 30, fastened by countersunk head screws 34, and coil yoke 13 into which said countersunk head screws 34 are screwed. These spacer assemblies 36 are provided so that deformation, such as warping and so forth, does not occur in coil substrate 30 caused by tightening of countersunk head screws 34, and are fit inside each armature coil 32.

Next, the following provides an explanation of the circuit substrate for performing supply of electricity and so forth to each of the above-mentioned armature coils 32.

As shown in FIGS. 6, 8 and 10, circuit substrate 40 is arranged in parallel with coil substrate 30 on the lower surface of bed 11 on which said coil substrate 30 is installed on its upper surface with coil yoke 13 in between. Moreover, said circuit substrate 40 is fastened to said bed 11 by a plurality of bolts (with hexagon sockets) 15. Furthermore, these bolts 15 serve to fasten the above-mentioned coil yoke 13 to bed 11.

As shown in FIG. 10, the above-mentioned circuit substrate 40 is composed by joining together a plurality of separate portions 45, each provided with a drive circuit composed of electronic components 43, 44 and so forth. These separate portions 45 are provided corresponding to each unit of two armature coils each of the fourteen armature coils 32 provided in a row. Thus, the number of these separate portions 45, in this case, is seven.

The drive circuit provided on each of the above-mentioned separate portions 45 contains one set of circuit portions supplying excitation current to one armature coil 32, or in other words, a circuit corresponding to two armature coils 32.

Continuing, the following provides a detailed description of the separated constitution of the above-mentioned circuit substrate 40 and coil substrate 30 arranged above it.

To begin with, the following provides an explanation of circuit substrate 40.

In the case of fabricating this circuit substrate 40, a base substrate 64, having a base length (a portion is shown in FIG. 10), is made available. This base substrate 64 is composed of, for example, six separate portions 45, explained based on FIG. 10, joined into a single unit. As was previously described, these separate portions 45 are provided with a drive circuit that performs supply of electrical power and so forth to two armature coils 32 each grouped in the form of individual units. Furthermore, as shown in FIG. 10, marks in the form of broken lines 65 are printed on both the top and bottom surfaces of base substrate 64 (only those on the bottom surface are shown in the drawing) for distinguishing each separate portion 45.

Since the previously described circuit substrate 40 must link together seven of the above-mentioned separate portions 45, said circuit substrate 40 is completed by severing one of the six separate portions 45 possessed by the above-mentioned base substrate 64 along the above-mentioned broken line 65 to separate, arranging this separated separate portion 65 in a row at one end of unseparated base substrate 64 as shown in FIG. 10, and mutually connecting their corresponding connection terminals.

Furthermore, in FIG. 10, connection between the above-mentioned separated separate portions 45 and base substrate 64 is performed, for example, by a single connection component 67 having terminals 67a fit into through holes 45b provided at the portion of both connection terminals. Furthermore, although connection between corresponding connection terminal portions may be performed using copper wire and so forth, by performing connection using this type of connection component 67, in addition to connection being able to be performed all at once, connections are reinforced due to the rigidity of said connection component 67. In addition, besides using components that simply act to make electrical connections, electronic components such as IC and so forth may also be used for connection component 67.

The following provides an explanation of coil substrate 30.

Although the overall coil substrate 30 is not shown, in the case of fabricating this coil substrate 30, a base substrate 59 of a length nearly equal to base substrate 64 for the above-mentioned circuit substrate 40 is made available as shown in FIG. 10. This base substrate 69 is composed by linking together six separate portions 70 into a single unit in the same manner as base substrate 64 for circuit substrate 40. As shown in the drawing, two armature coils 32 each are affixed, grouped together in units, on these six separate portions 70, thus making the total number of armature coils 32 arranged in a row on base substrate 69 twelve. Furthermore, as shown in FIGS. 10 and 7, marks in the form of broken lines 71 are printed on the top and bottom surfaces of base substrate 69 to distinguish these separate portions 70. As shown in FIG. 10, coil substrate 30 is formed by joining and connecting a single separate portion 70 separated from another base substrate not shown to one end of this unseparated base substrate 69. Furthermore, in FIG. 10, reference numeral 70a indicates connection terminals provided on each separate portion 70.

Furthermore, in the description thus far, although two armature coils 32 each and a drive circuit for driving said armature coils 32 are separated into units with respect to coil substrate 30 and circuit substrate 40, three or more armature coils and their drive circuit may also be separated into their respective units. In addition, although base substrate 64, which supports twelve armature coils 32, and base substrate 69, on which a plurality of drive circuits are arranged in a row corresponding to two of these armature coils 32 each, are made available during fabrication of the drive unit equipped with a total of fourteen armature coils 32 in the present embodiment, it is only natural that the setting of the total length of these base substrates 64 and 69, namely the numbers of armature coils and drive circuits to be equipped on these, can be suitably changed.

In addition, although coil substrate 30 and circuit substrate 40 are composed by separating at least one of separate portions 45 and 70 provided on base substrates 64 and 69, and joining it to unseparated base substrates 64 and 69 in the present embodiment, in the case the operating stroke of the drive unit to be fabricated is shorter than the total length of base substrates 64 and 69, at least one of each of separate portions 45 and 70 provided on each of said base substrates 64 and 69 should be cut away as necessary. Thus, a substrate of desired length can be easily obtained by cutting off one separated portion from the base substrate and joining to another unseparated base substrate, or simply removing a portion of the base substrate. In addition, the remaining portion of the base substrate from which a portion has been cut away as mentioned above can also be used in other applications in any state.

As shown in FIGS. 8 and 10, coil substrate 30 and circuit substrate 40, which are arranged to be mutually separated by bed 11 and coil yoke 13, are connected by connecting a plurality, in this case seven, of connection devices in the form of both corresponding male and female connectors 73 and 74 provided on mutually opposing sides of both said substrates. One each of these connectors 73 and 74 is arranged with respect to each separate portion 45 and 70 each provided with two armature coils 32 and their drive circuit grouped into a unit as previously described. As shown in FIG. 8, said connectors 73 and 74 are mutually connected through apertures 11e and 13e formed in bed 11 and coil yoke 13. Thus, since one each of connectors 73 and 74 is provided for each of separate portions 45 and 70 of coil substrate 30 and circuit substrate 40, when mutually assembling both said separate portions 45 and 70, the directions of both can be recognized both quickly and easily, thus facilitating assembly work. Furthermore, connection of corresponding separate portions 45 and 70 may be performed by lead wires and not by connectors as described above. In addition, with respect to the number of connectors, besides providing only one connector for each of separate portions 45 and 70 as mentioned above, two or more connectors may also be provided.

On the other hand, the secondary side of the linear direct current motor is composed in the manner described below.

Figure 11:
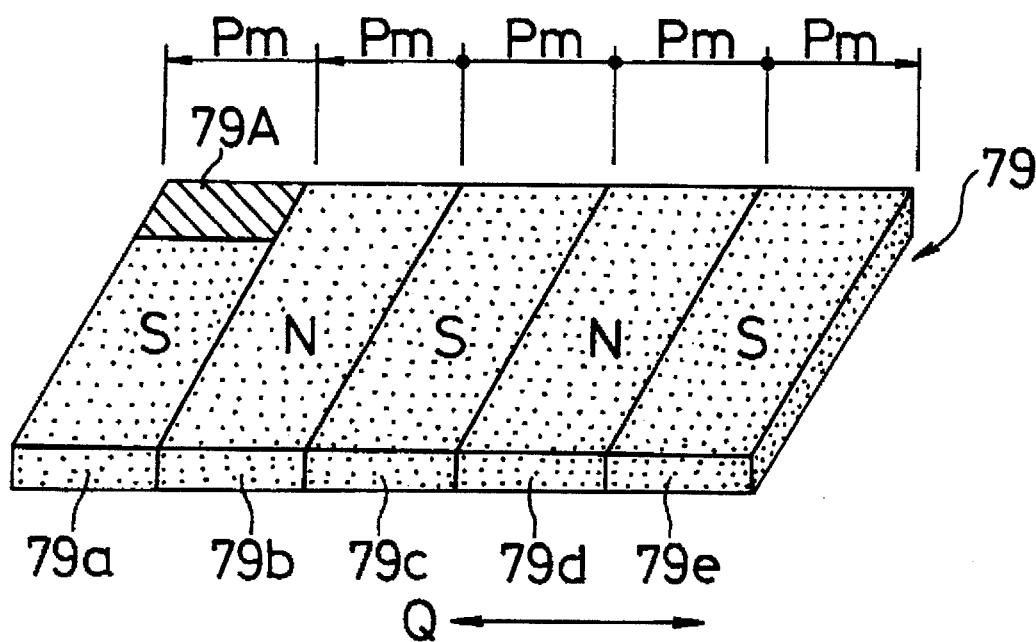
FIG. 11 is a perspective view of a field magnet that is one of the constituent members of the secondary side of the linear direct current motor contained in the drive unit shown in FIGS. 6 through 8.

As shown in FIGS. 6 and 8, said secondary side has magnet yoke 78, mounted on the lower side of table 12, and field magnet 79 anchored on the lower surface of said magnet yoke 78 to oppose each of the above-mentioned armature coils 32 of the primary side. As shown in FIG. 11, the overall shape of field magnet 79 is formed into roughly that of a rectangular plate, and a plurality of N and S magnetic poles, for example 5, are magnetized so as to be alternately arranged in a row along direction Q in which relative movement is performed by the primary and secondary sides, namely the lengthwise direction of bed 11. However, as shown in FIG. 11, only the surface that opposes the Hall effect element for position detection described later of, for example, magnetic pole S, which is one of the endmost magnetic poles, is either shielded with a non-magnetic material or is composed in the form of non-detected magnetic pole 79a formed with non-magnetic material 79A. Furthermore, said magnetic pole S may also be composed by cutting away a portion of non-magnetic material 79A of non-detected magnetic pole 79a.

In said drive unit, a position detection device having the constitution described below is provided for detection of the relative positions of the above-mentioned bed 11 and table 12.

Namely, said position detection device is composed of linear magnetic scale 81 shown in FIGS. 6 through 8, and magnetic sensor portion 82 shown in FIG. 8. Said linear magnetic scale 81 extends in the direction of movement of the above-mentioned table 12, and together with a large number of N and S magnetic poles being alternately magnetized at a precise pitch along its lengthwise direction, an origin signal magnetized portion is formed on one end. On magnetic sensor portion 82, together with providing a Hall effect element for origin detection, another two Hall effect elements for the A and B phases are arranged mutually shifted by ½ the above-mentioned pitch. As a result of employing said constitution, both A phase and B phase signals are obtained, thereby enabling detection of relative position and discrimination of direction of movement.

Furthermore, as shown in FIGS. 6 and 8, cables in the form of flexible substrates 84 for obtaining signals from the above-mentioned magnetic sensor portion 82, and cover 85, which covers said flexible substrates 84, are provided.

In the drive unit having the above-mentioned constitution, by supplying a prescribed excitation current to each armature coil 32, thrust is generated based on Fleming's right hand rule between the primary and secondary sides. For example, if base member 11, to which the primary side is coupled, is taken to be the stationary side, table 12, integrated into a single unit with the secondary side, is moved by this thrust. Moreover, the position of table 12 with respect to bed 11 is detected by the position detection device described above.

The following provides an explanation of the constitution for controlling the supply of electrical power to each armature coil 32 described above.

Figure 12:
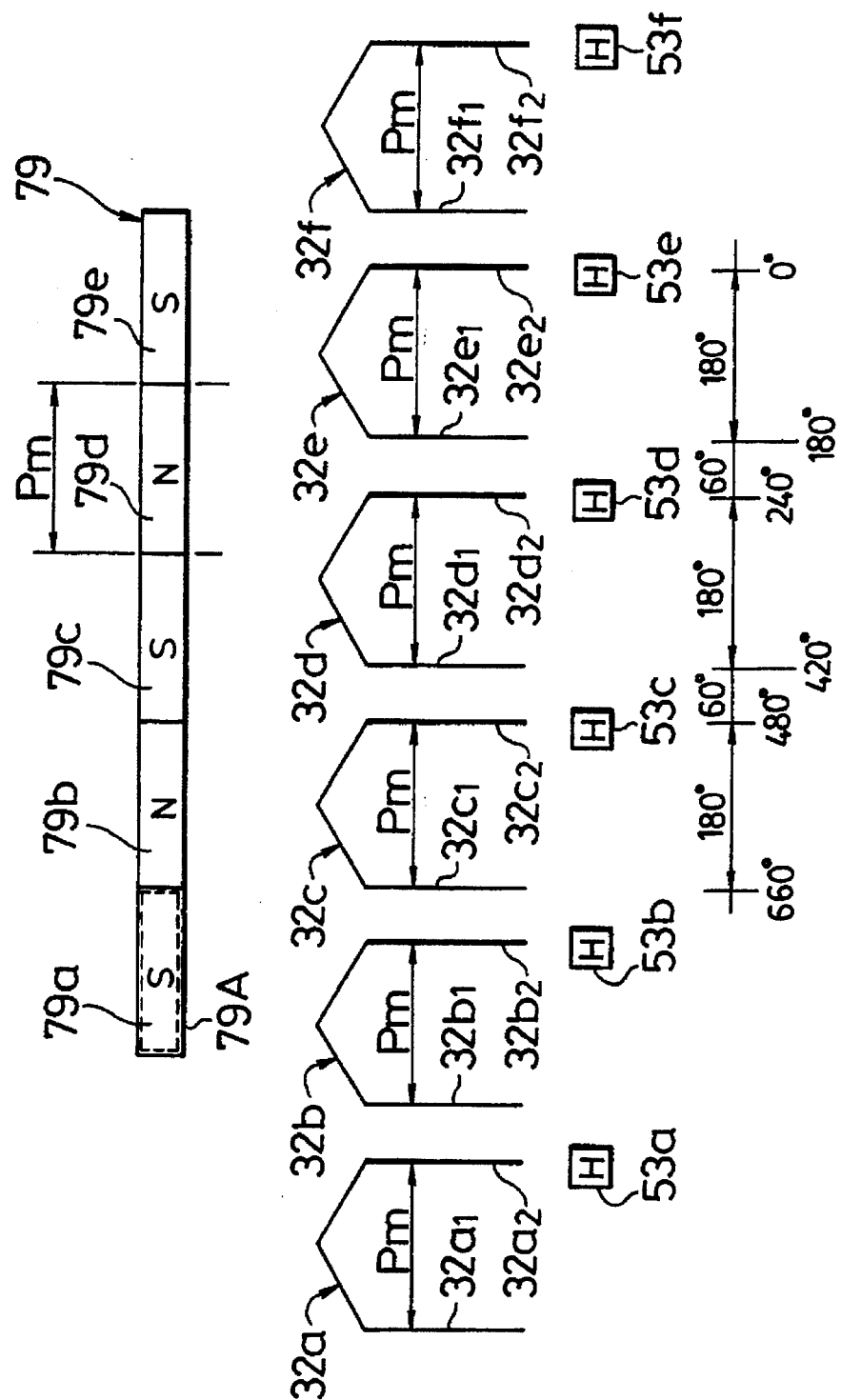
FIG. 12 is a conceptual drawing of the constitution of the linear direct current motor contained in the drive unit shown in FIGS. 6 through 8.

As shown in FIG. 12, in the present embodiment, the open angle width between conductors $32a_1$ through $32f_1$ and $32a_2$ through $32f_2$ that contribute to thrust, and are possessed by each armature coil 32a through 32f (in this case, six armature coils are shown in FIG. 12, and these six armature coils are mutually distinguished by adding small letters of the alphabet from a through f to reference numeral 32 indicating armature coils in the explanation thus far for the sake of convenience in the explanation) on two sides each, is set to be equal to width Pm of each of magnetic poles 79a through 79e of field magnet 79. However, this open angle width of the armature coils is set to be roughly 2n−1 times (where n is an integer of at least 1) the magnetic pole width of field magnet 79. Normally, n is set to a value of 1, and is set to that value in the present embodiment. In addition, the interval between adjacent armature coils is set to ⅓ of width Pm of the magnetic poles. Thus, as shown in FIG. 12, the open angle width of the armature coils in the present invention is 180°, and the interval between armature coils is set at 60°.

As shown in FIG. 12, based on the above-mentioned constitution, magnetic pole discrimination elements in the form of Hall effect elements 53a through 53f are arranged in the vicinity of each armature coil 32a through 32f (six Hall effect elements are shown in FIG. 12 in this case, and the small letters of a through f are added to reference numeral 53 used to indicate Hall effect elements in the aforementioned explanation to mutually distinguish these six Hall effect elements for the sake of convenience in the explanation). These Hall effect elements 53a through 53f are correspondingly arranged so as to be of the same phase as each of the magnetic poles of the above-mentioned field magnet 79. In the present embodiment, each of Hall effect elements 53a through 53f is arranged corresponding to conductors $32a_2$ through $32f_2$ on one side among the conductors that contribute to thrust possessed on two sides by each armature coil 32a through 32f.

These Hall effect elements 53a through 53f emit a signal (in the form a potential difference) corresponding to the lines of magnetic force emitted by each magnetic pole possessed by field magnet 79 when said field magnet 79 approaches. This signal is then fed to the above-mentioned drive circuit, and electrical power is supplied to the armature coil corresponding to the Hall effect element that emitted said signal based on that signal. This supply of electrical power is interrupted to the armature coil corresponding to a Hall effect element for which said signal has yet to be obtained or is no longer being obtained, thus enabling control to be performed. Thus, by systematically supplying a prescribed excitation current to each armature coil, thrust is generated based on Fleming's right hand rule between the primary and secondary sides. For example, if bed 11, to which the primary side is coupled, is taken to be the stationary side, table 12, integrated into a single unit with the secondary side, is moved by this thrust.

Supply of electrical power is controlled in the manner described below based on the above-mentioned constitution.

Figure 13:
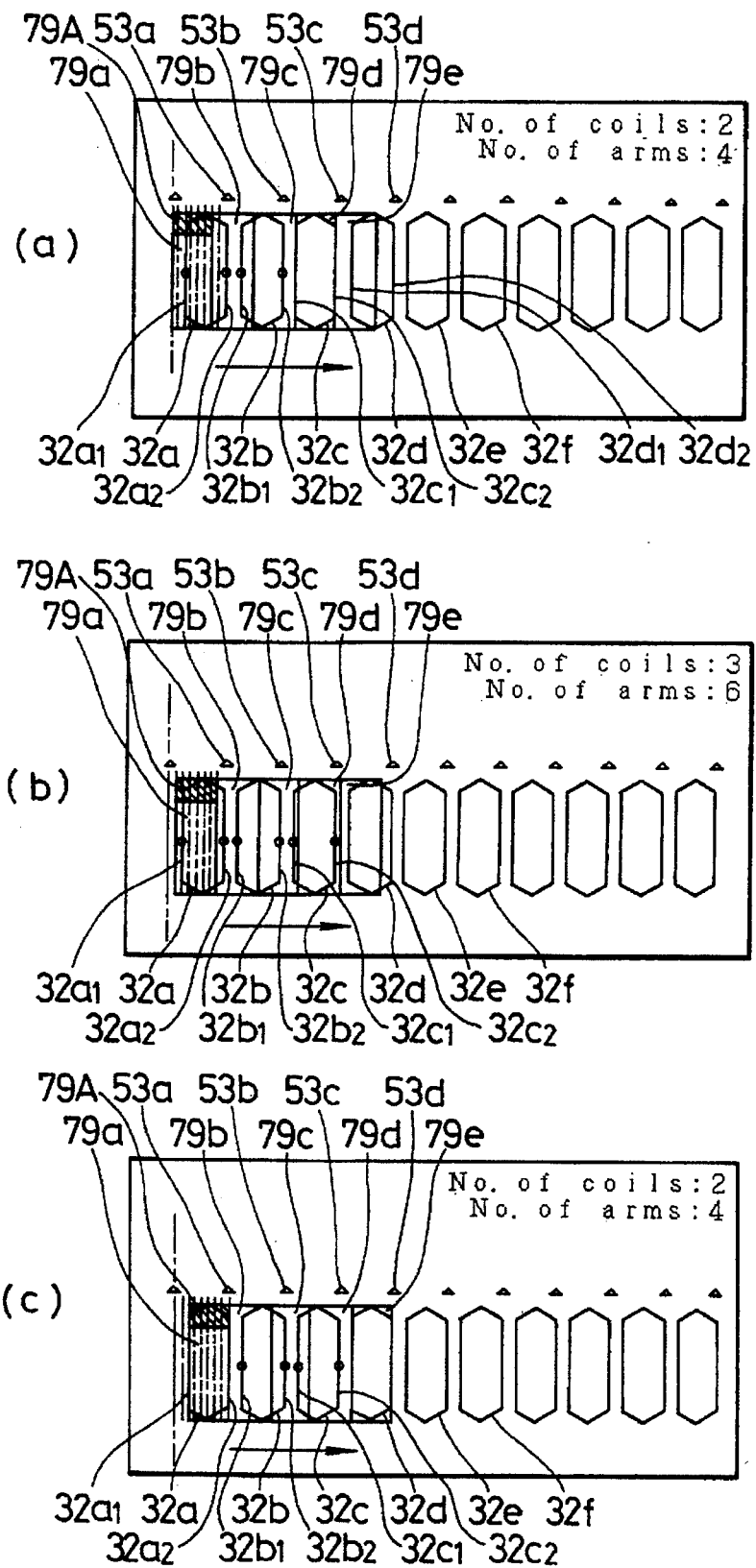
FIG. 13 is an explanatory drawing of the operation of the linear direct current motor contained in the drive unit shown in FIGS. 6 through 8.
Figure 14:
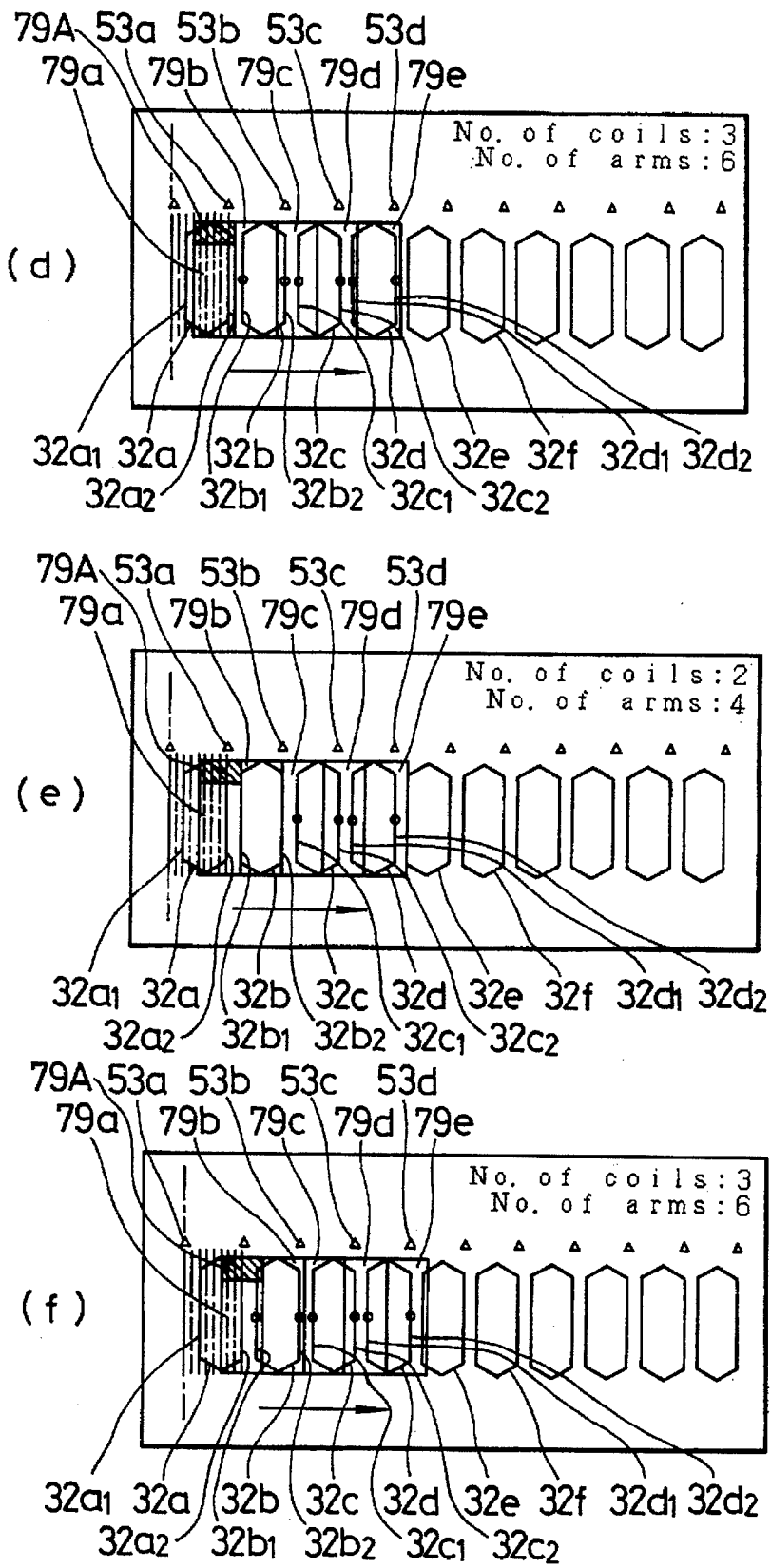
FIG. 14 is an explanatory drawing of the operation of the linear direct current motor contained in the drive unit shown in FIGS. 6 through 8.
Figure 15:
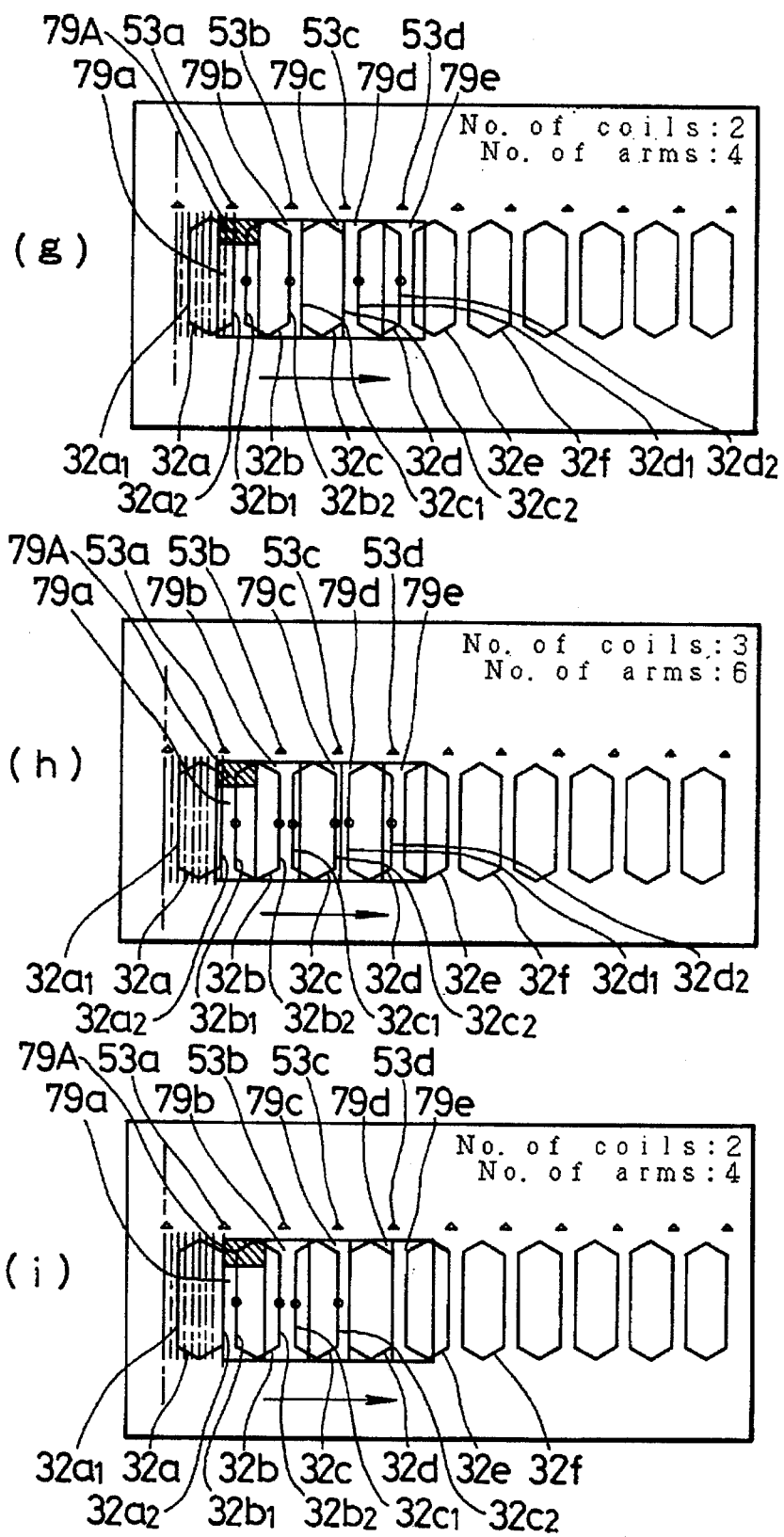
FIG. 15 is a conceptual drawing of the operation of the linear direct current motor contained in the drive unit shown in FIGS. 6 through 8.

In FIGS. 13 through 15, letters (a) through (i) indicate the relationship of the relative positions of armature coils 32, Hall effect elements 53 and field magnet 79 that change with movement of field magnet 79. In the present embodiment, since magnetic pole width=armature coil width=Pm, and the distance between armature coils is set to Pm/3, these changes can be considered to occur for every distance of Pm/6. Thus, all changes in relative position can be viewed by the above-mentioned (a) through (i) shifted by Pm/6 each. In the present embodiment, a constitution is employed wherein the open angle width of the armature coils is taken to be Pm, the distance between armature coils is taken to be Pm/3, and this is then divided into 8 divisions. Thus, movement is made 30° at a time in the present embodiment as shown in FIG. 12.

To begin with, in the case field magnet 79 is at position (a) of FIG. 13, namely in the case armature coil 32c and magnetic pole 79d are superposed, since only magnetic poles 79b and 79c of said field magnet 79, and excluding non-detected magnetic pole 79a, act on two Hall effect elements 53a and 53b, electrical power is supplied to two armature coils 32a and 32b respectively corresponding to these Hall effect elements. In this state, as is clear from the same drawing, since each conductor $32a_1$, $32a_2$, $32b_1$ and $32b_2$, of which two sides each are possessed by both said armature coils 32a and 32b, generates thrust by magnetic poles 79a, 79b and 79c of field magnet 79, the number of conductors that contribute to thrust is four. These are indicated with a circle in said drawing. Furthermore, since conductors $32c_1$, $32c_2$, $32d_1$ and $32d_2$ of the other two armature coils 32c and 32d either act on the boundary between adjacent magnetic poles of field magnet 79 (conductors $32c_1$ and $32c_2$) or the corresponding Hall effect elements move away from field magnet 79, thrust is not generated.

Next, in the case field magnet 79 is at position (b) of FIG. 13, namely in the case field magnet 79 has been moved in the direction of the arrow by Pm/6, as shown in this same drawing, each of magnetic poles 79b, 79c and 79d, excluding non-detected magnetic pole 79a, of field magnet 79 act on three Hall effect elements 53a through 53c. Accordingly, electrical power is supplied to the three armature coils 32a through 32c corresponding to these three Hall effect elements. As is clear from said drawing, in this state, since thrust is generated as a result of conductors $32a_1$, $32a_2$, $32b_1$, $32b_2$, $32c_1$ and $32c_2$, of which two sides each are possessed by each of said armature coils 32a through 32c, acting on magnetic poles 79a, 79b, 79c and 79d of field magnet 79, the number of conductors generating thrust is six.

Although the following operations are omitted since the explanation is similar, when field magnet 79 is at each of the remaining positions (c) through (i), the number of conductors contributing to thrust possessed by each armature coil that actually generate is either four or six regardless of the position of said field magnet 79. Conversely, this applies similarly in the case of moving from position (i) toward position (a). Thus, the number of conductors of armature coils that generate thrust is either four or six regardless of the change in the relative positions of the primary and secondary sides. Accordingly, changes in thrust are relatively small, thus enabling thrust to be maintained constant at all times The relationship between the number of conductors of the armature coils that contribute to thrust and the thrust that is actually generated is shown in FIG. 16 wherein the relative position changes between the above-mentioned field magnet and armature coils are shown for 1 cycle. Compared with a four pole, three coil drive unit of the prior art shown in (a) of FIG. 16, in the 5 pole, 3 coil drive unit of the embodiment of the present invention shown in (b) of FIG. 16, it is clear that changes in thrust are stabilized and the size of those changes is also small. Moreover, since the change in coil drive current is also constant, it is clear that there are few changes in thrust ripple and so forth.

Furthermore, in FIG. 12, if the position at which each Hall effect element is currently arranged, namely the position of conductors $32a_2$ through $32f_2$ on the right side of each armature coil 32a through 32f, is expressed as an electrical angle of 0° (in the drawing, however, the position of Hall effect element 53e, namely the position of conductor $32e_2$ of armature coil 32e, is indicated as 0° as a representative example), the electrical angle positions of the conductors of each armature coil are as shown in the drawing in the case of a linear direct current motor like that in the present embodiment having 5 poles and 3 coils.

In addition, although a guide unit having a mechanical constitution is shown for the guiding device that performs mutual guiding of the primary side and secondary side in the above-mentioned embodiment, a guiding device can be employed having a constitution that relatively levitates both primary and secondary sides by the pressure of a fluid (air or oil) or magnetic force.

In addition, although a moving magnet type of linear direct current motor is shown in the above-mentioned embodiment wherein the side containing armature coils 32 is taken to be the stationary side and the side containing field magnet 79 is taken to be the moving side, the present invention can also be applied to a moving coil type of linear direct current motor.

Moreover, the present invention may be applied similarly in the form of another embodiment in the case of bed 11 and so forth having a certain curvature, and the present invention performing curved motion.

According to the present invention as has been explained above, since the size of the change in the number of conductors of armature coils that generate thrust is small regardless of changes in the relative positions of the primary and secondary sides, the present invention offers the advantage of being able to maintain stable thrust at all times. In addition, the present invention enables this stable thrust to be obtained with a simple constitution.

What is claimed is:

1. A linear direct current motor equipped with: a field magnet in which P number of poles (P being an integer of at least 2) are arranged and magnetized so that they are sequentially different; a group of armature coils wound so that the open angle width of the conductors contributing to thrust is roughly $2n-1$ times (where n is an integer of at least 1) the magnetic pole width of said field magnet, which relatively drive said field magnet by being arranged so as to oppose said field magnet and supplying excitation current; and, magnetic pole discrimination elements, provided corresponding to each said armature coil, which perform discrimination of the magnetic poles of said field magnet; wherein, the endmost magnetic poles of said field magnet are non-detected magnetic poles with respect to said magnetic pole discrimination elements.

2. A linear direct current motor as set forth in claim 1 wherein said non-detected magnetic poles are composed with a non-magnetic material.

3. A linear direct current motor as set forth in claim 1 wherein said non-detected magnetic poles are attached to said field magnet and integrated into a single unit with said field magnet.

4. A linear direct current motor as set forth in claim 1 wherein said non-detected magnetic poles are formed by cutting away a portion of them.

* * * * *